United States Patent [19]

Uejima

[11] Patent Number: 5,186,688
[45] Date of Patent: Feb. 16, 1993

[54] METHOD OF MANUFACTURING AUSTENITIC STAINLESS STEEL DRILL SCREWS

[75] Inventor: Yasu Uejima, Osaka, Japan

[73] Assignee: Hargo 300-Technology, Inc., Tyler, Tex.

[21] Appl. No.: 853,102

[22] Filed: Mar. 18, 1992

[30] Foreign Application Priority Data

Jul. 26, 1991 [JP] Japan .................................. 3-276095

[51] Int. Cl.$^5$ ............................................. B12H 3/02
[52] U.S. Cl. ......................................... 470/9; 148/587
[58] Field of Search ..................... 470/9, 17, 32, 38, 8, 470/10; 148/587, 624; 72/364

[56] References Cited

U.S. PATENT DOCUMENTS

| | | |
|---|---|---|
| 2,146,825 | 2/1939 | Kinney ........................ 470/9 |
| 2,637,672 | 5/1953 | Losco et al. ................ 470/17 |
| 2,957,790 | 10/1960 | Metcalfe ................... 148/587 |
| 3,740,274 | 6/1973 | Chow . | 
| 3,871,925 | 3/1975 | Nunes . |
| 3,877,281 | 4/1975 | Shimizu et al. ............ 470/17 |
| 4,023,225 | 5/1977 | Tochilkin et al. .......... 470/9 |
| 4,129,461 | 12/1978 | Rashid ....................... 148/624 |
| 4,147,088 | 4/1979 | Whittaker, Jr. ........... 470/9 |
| 4,289,006 | 9/1981 | Hallengren ................. 72/38 |
| 4,295,351 | 10/1981 | Biorklund et al. ......... 72/38 |
| 4,584,032 | 4/1986 | Isokawa et al. ........... 148/624 |
| 4,718,908 | 1/1988 | Wigginton et al. ....... 623/16 |

*Primary Examiner*—Lowell A. Larson
*Assistant Examiner*—Michael J. McKeon
*Attorney, Agent, or Firm*—Baker & Botts

[57] ABSTRACT

A method for manufacturing drill screws from austenitic stainless steel, which offers sufficient hardness for drilling and tapping into sheet iron and avoids the problems of intergranular corrosion and other erosions by taking full advantage of hardenability through cold working of austenitic stainless steel.

The drill screw is manufactured by cold working from austenitic stainless steel. The above-mentioned material is formed into the head section (1) and shaft section (2) by header processing. The tip of the shaft section (2) is formed into the drill section (3) with the point (4), and with the cutting edge (5) running up to the tip. This is accomplished by pressing with a pair of pointer dies (7). On the die face (8), the cutting edge (9) and the receiving face (10) face each other. The shaft part (2) is formed into the screw part (6) by threading with a rolling die. Finally, all surface areas are passivated before aging treatment is applied.

8 Claims, 2 Drawing Sheets

METHOD OF MANUFACTURING AUSTENITIC STAINLESS STEEL DRILL SCREWS

TECHNICAL FIELD OF THE INVENTION

The present invention is applied in the manufacturing of austenitic stainless steel drill screws. Drill screws requiring high strength and resistance to corrosion are used mainly in binding sheet iron used for roofs and walls in buildings and structures such as chemical plants. Such screws are manufactured with austenitic stainless steel.

BACKGROUND OF THE INVENTION

The drill screw incorporates a drill section for drilling a lower hole. Recently, austenitic stainless steel has been proposed as a suitable material for drill screws. (Refer for instance to No. Jikkai-Sho-60-75461 official report, No. Jikkai-Sho-62-40320 official report or No. Tokkai-Shohei-2-142911 official report.)

This is because the high degree of corrosion resistance of austenitic stainless steel has aroused the attention of those interested in extending the life span of the screw by means which could not be achieved by conventional drill screws made of carbon steel. However, as austenitic stainless steel offers, generally speaking, less cold-workability than carbon steel, drill screws are usually made of a category of steel which has less hardening property in cold-working due to the addition of copper. (For instance, JIS SUS-XM7).

However, austenitic stainless steel has a Vickers hardness of only 300–400 degrees, even after heavy cold-working is applied. While this kind of drill screw can be used with aluminum, it does not offer sufficient hardness for sheet irons. For sheet iron, drill screws must be processed for increased hardness. However, as austenitic stainless steel is not hardened by tempering, it must be hardened by an alternative hardening process. The following measures are working processes with austenitic stainless steel:

a. Those in which the head and part of the screw portion of a drill screw are made of austenitic stainless steel, whereas part of the drill, as well as the screw portion consist of carbon steel tempered by carburizing. After the screwing part and drilling part having been welded together, the drill part and screw part are formed. (For example, refer to No. Tokkai-Shohei-2-142911 official report.)

b. Those in which a hardened layer is formed over all or part of the drill and screw sections of an austenitic stainless steel drill screw by carburizing and nitriding hardening process. (For example, refer to No. Jikkai-Sho-62-40320 official report.)

c. Those in which a hard film such as nitrided titanium, etc., is coated over all or part of the drill and screw portions of an austenitic stainless steel drill screw by application of the PVD (Physical Vapor Deposition) method or the like, or those in which a hardened film of nickel/phosphorus alloy is produced on the part as above by nonelectrolytic plating. (For example, refer to No. Jikkai-Sho-60-75461 official report as above.)

d. Those in which the screw top and screw portion are made of hard austenitic stainless steel and the drill part is made of processed and hardened carbon by carburizing and the two parts are jointed by pressing. (For example, refer to No. Tokkai-Shohei-2-142911 official report as above.)

SUMMARY OF THE INVENTION

Unlike conventional manufacturing methods, this manufacturing method for austenitic stainless steel drill screws increases the drilling and tapping capabilities of drill screws and eliminates the detrimental effects of intergranular corrosion and other erosion by maintaining tensile strength and giving drill screws the required hardness for sheet iron applications. In addition, this method improves productivity and saves costs by taking full advantage of austenitic stainless steel's material characteristics and good hardenability in cold working.

Unlike conventional methods, drill screws are manufactured in this method from austenitic stainless steel by cold working hardening through pressing, while hardening is accomplished through aging. As a result, the increased cold working rate of austenitic stainless steel offers a high degree of cold working hardening, while aging can increase hardness all the more.

Therefore, by this method of manufacturing drill screws, we can manufacture drill screws which are made entirely of austenitic stainless steel but do not undergo any hardening treatment such as carburizing or nitriding, yet have the required hardness for sheet iron applications, and offer improved drilling and tapping capabilities.

Unlike conventional methods, this drill screw manufacturing method necessitates no hardening treatment such as carburizing or nitriding, maintains sufficient tensile strength, eliminates intergranular corrosion and retains corrosion resistance. The elimination of hardening measures such as carburizing or nitriding treatment simplifies manufacturing processes and facilities, thereby reducing manufacturing costs.

Moreover, as the drill screw is entirely fabricated from the same material as the whole unit, neither the drill part nor the hardened layer will separate or exfoliate during use.

DETAILED DESCRIPTION OF THE INVENTION

Figure 1:
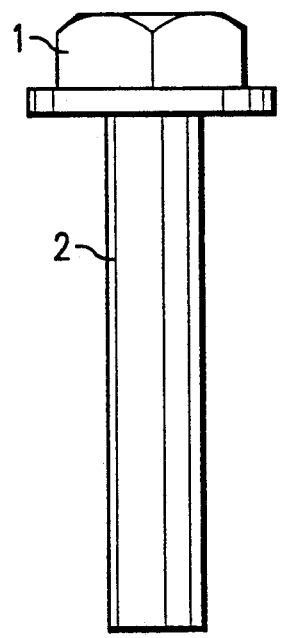
FIG. 1—An embodiment of this drill screw manufacturing method, the figure shows a front view of a head and shaft formed from austenitic stainless steel.

As stated above, hardening treatments such as carburizing and nitriding are indispensable in the manufacture of austenitic stainless steel screws, without which it was impossible to provide sufficient hardness for drilling and tapping. However, the above-mentioned conventional hardening measures for austenitic stainless steel involve the following problems:

In case a. above, where the carbon steel drilling part tempered by carburizing is jointed to the screwing part of an austenitic stainless steel drill screw, the drill and screw parts are formed after jointing. Tempering by carburizing then takes place. Therefore, there is unavoidably a problem of intergranular corrosion from which austenitic stainless steel suffers the most. In addition, the hardened drilling part of an austenitic stainless steel drill screw produced by cold processing is softened by the above-mentioned method of tempering by carburizing, causing its tensile strength to be reduced.

In case b. above, where a layer hardened by the carburizing and nitriding processes is formed over all or part of an austenitic stainless steel drill screw, there is, as in case a. above, also the problem of intergranular corrosion, depending on the carburizing and nitriding temperatures. Further, as the layer hardened by carburizing and nitriding is easily oxidized, red rust and oxidation may occur.

Finally, when the hardened layer is thin, drilling and tapping capacity may be reduced, on the other hand, when it is thick, the hardened layer may be exfoliated.

Those in which a film such as nitrided titanium, etc., is coated by the PVD or a similar method over all or part of a drill screw, as mentioned in case c. above: Here, also, the problem of intergranular corrosion exists. Likewise, the hardened film is easily oxidized, and the unit is also oxidized by red rust. Tapping capacity is reduced if the hardened layer is thin and the hardened layer is exfoliated if it is thick, as in case c. above. In addition, use of hard film of nickel/phosphorus alloy produced by nonelectrolytic plating also lack practical applicability as the hard film tends to exfoliate.

When the carbon steel drill section tempered by carburizing is jointed by pressing to the screw part of an austenitic stainless steel drill screw, the screw parts have sufficient tapping capacity after being hardened through cold processing, retain their corrosion resistance and they have ample hardness. However, as the jointing is made by pressing, productivity is low and the drill section may separate through use.

This invention was brought about as a result of research to eliminate those conventional problems stated above and manufacture integrated drill screws made of austenitic stainless steel. Accordingly, the purpose of this invention is to maintain tensile strength, improve productivity and reduce costs. This is achieved by taking advantage of the cold process hardenability of austenitic stainless steel. Another aim was to offer a manufacturing method for austenitic stainless steel drill screws that avoids the detrimental effects of intergranular or other corrosion by hardening the screw and drill sections, particularly at the point position, thereby offering sufficient hardness to drill and tap into sheet iron materials.

The manufacturing method for austenitic stainless steel drill screws employed in this invention is to manufacture drill screws from austenitic stainless steel by cold processing, where the head (1) and shaft (2) are formed from the austenitic stainless steel material through header working (refer to FIG. 1).

Figure 2:
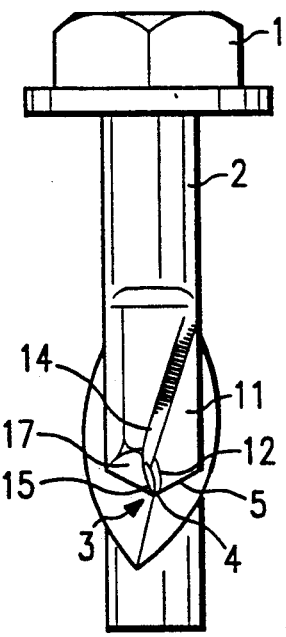
FIG. 2—A front view of the formed drill part, whose point has its cutting edge running up to the shaft's tip, as shown in FIG. 1.

The end of the shaft (2) made from the material is formed into the drill portion (3) with a pointed part (4), and with the cutting edge (5) running up to the tip. This is done by pressing with a pair of pointer dies (7) with the cutting edge (9) of the individual die face (8) facing the receiving face (10) of the counterpart (refer to FIGS. 2 and 8).

Figure 3:
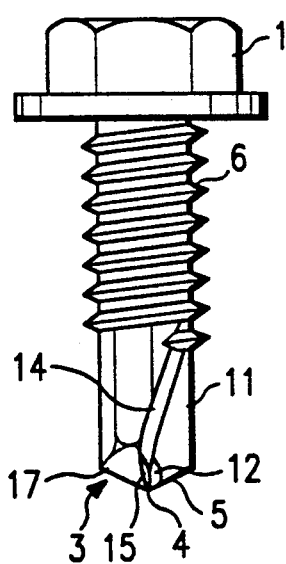
FIG. 3—A front view of the formed screw section of the shaft indicated in FIG. 1.
Figure 4:
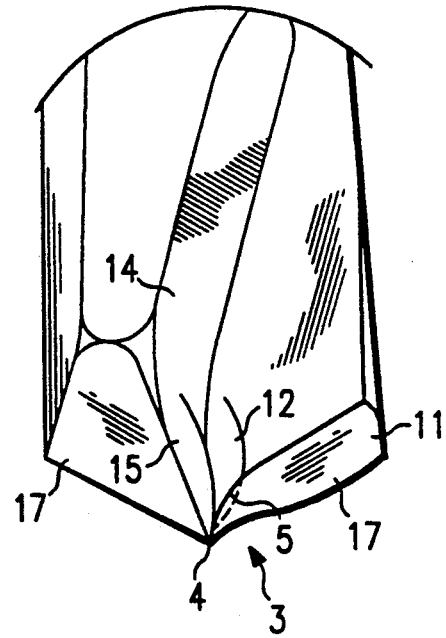
FIG. 4—An enlarged view of the drill section of the drill screw manufactured by this method.
Figure 5:
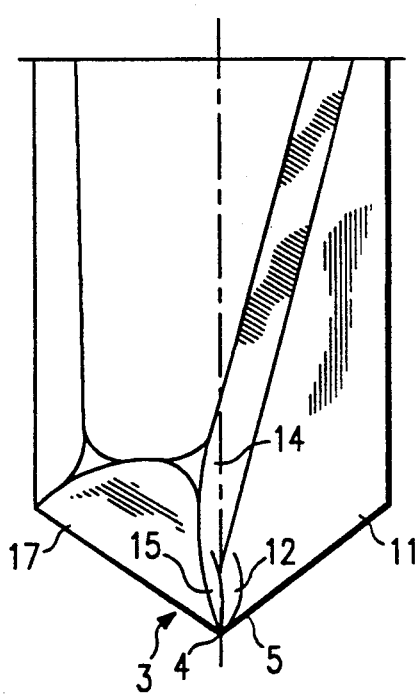
FIG. 5—A front view of the drill section shown in FIG. 4.
Figure 7:
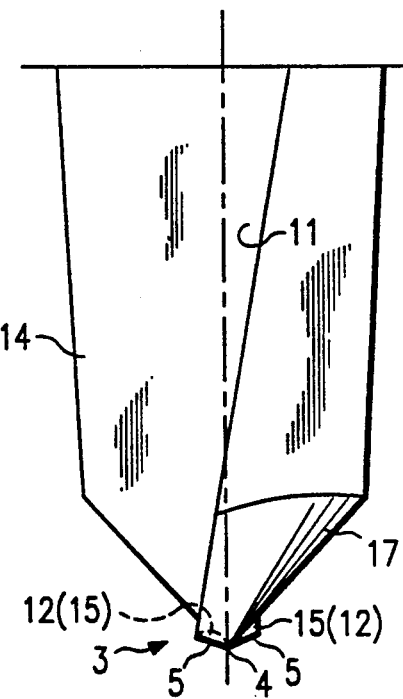
FIG. 7—A side view of the drill section shown in FIG. 4.

The shaft (2) is then formed into the screw portion (6) by threading with the rolling die (refer to FIG. 3) and the entire surface area is passivated. The aging treatment is applied last.

In the above process, aging (precipitation hardening) must be done so that temperature and time factors do not cause the austenitic stainless steel to undergo sensitization (intergranular corrosion).

As noted above, the manufacturing method for austenitic stainless steel drill screws involves forming austenitic stainless steel material into a head (1) and shaft (2) by header or cold working. The tip of the shaft (2) is then formed into a drill (3) having a pointed part (4), with the cutting edge (5) made to run up to the tip by pressing with a pair of pointer dies (7) having die faces (8) with the cutting edge (9) and the receiving face (10) facing each other. The shaft (2) is then formed into the screw part (6) by threading with the rolling die. Aging treatment occurs after the entire surface area is passivated.

As the manufacturing method for this invention involves pressing drill screws by cold processing from austenitic stainless steel, it offers a high rate of cold working. For instance, in the forming of the point (4), the austenitic stainless steel is pressed against the receiving face (10) of one pointer die (7) by the cutting edge of the other pointer die (7) and formed under pressure. Therefore, the point is not formed, as was conventionally the case, by both of the cutting edges of the pointer dies cutting the material fiber (metallic structure).

Consequently, this manufacturing method offers a high rate of cold working and therefore improved drilling capacity since drill screws are greatly hardened by cold working and thereby possess great hardness in their points (4). Moreover, as the aging treatment is carried out last, internal nitrogen and other chemicals are precipitated on the surface, which increases hardness still further.

With this method for manufacturing drill screws, there is no need for any hardening treatment such as carburizing or nitriding. Therefore, drill screws manufactured according to this method suffer no intergranular corrosion as a result of carburizing and nitriding and retain corrosion-resistance and sufficient tensile strength. Moreover, being an integrated drill screw which is fabricated of highly hardened austenitic stainless steel, the drill sections do not separate nor does the hardened layer exfoliate during use.

Finally, since this manufacturing method does not require carburizing or nitriding, manufacturing processes and facilities can be simplified and a reduction in manufacturing costs is obtainable.

For drill screws, 18Cr-12Ni austenitic stainless steel with a small amount of nitrogen added for increased hardening in cold working is used. A representative example of chemical constituents would include (weight in percentages) C 0.08, Si 0.8, Mn 1.5, Ni 12, Cr 18, N 0.22 and slight quantities of Al and V, etc.

Aging requires quantities of temperature and time that will not cause sensitization of the austenitic stainless steel, which are established as 500° C. and 2 hours.

Figure 8:
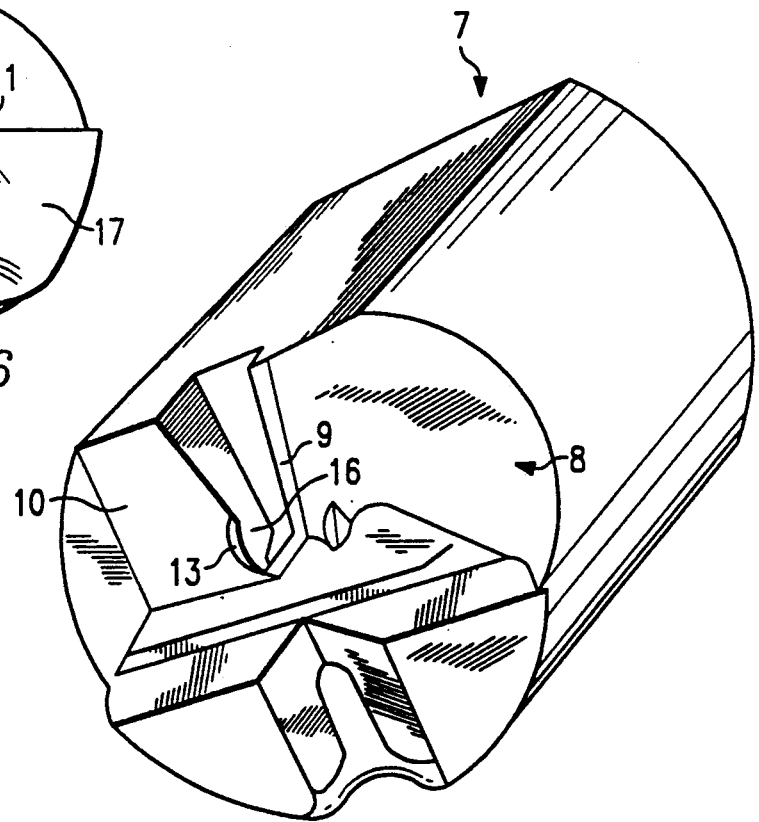
FIG. 8—An enlarged view of the metal die used in this manufacturing method.

Regarding the metal die used in drill screw manufacture, a pair of pointer dies (7) of identical shape are employed, each having its cutting edge (9) on the die face (8) facing the receiving face (10) of its counterpart. As shown in FIG. 8, each die face (8) has an arched convex section (13) which presses and forms the arched concave section (12) in order to form the cutting edge, which faces and is located near the tip of the torsion angle forming surface (11) on the side of each cutting edge (5) of the drill part. In addition, the arched convex part (16) as located presses and forms the supplementary arched convex part (15), which faces and is located near the tip of the relief angle forming surface (14) of each torsion angle on the other side of the drill section (3).

When a drill screw is manufactured by the above metal die, the cutting edge (5) with a rake angle running up to the tip is formed on the point (4) at the tip of the drill screw. The arched concave section (12) for forming the rake angle is formed by the arched convex section (13) of each pointer die (7) at a position near the tip of the torsion angle forming surface (11) on the side of each cutting edge (5).

Figure 6:
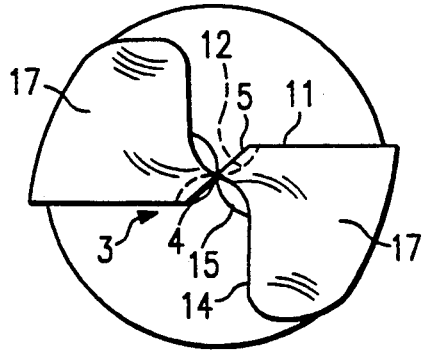
FIG. 6—A base view of the drill section shown in FIG. 4.

At the same time, the arched concave section (16) of the pointer dies form a corresponding supplementary arched convex section (15) at a position near the relief angle forming surface (14) of each torsion angle on the corresponding side, on each relief surface (17) of the point (4). The width of the escaping surface (17) of each land part decreased at the arched concave part (12) for forming the rake angle is enlarged and reinforced (refer to FIG. 6).

In the above case, the point (4) is formed as a result of the austenitic stainless steel being pressed against the receiving face (10) of the counterpart by the cutting edge (9) of each die face (8). Therefore, its cold working rate as well as hardening effect are so high that the point has very high hardness. Moreover, the aging treatment increases the facial hardness of the point (4) all the more.

When a drill screw manufactured after the above embodiment was measured for hardness, it was found that the facial hardness of the cutting edge (5) of the point (4), the area which demands the highest hardness, was over 500 Vickers (Hv). This result confirmed that the level of hardness required for drill screws in sheet iron applications requiring great hardness was achieved and that they also had high drillability and tapability.

The present invention, and many of its intended advantages, will be understood from the foregoing description and it will be apparent that, although the invention and its advantages have been described in detail, various changes, substitutions, and alterations may be made in the manner, procedure, and details thereof without departing from the spirit and scope of the invention, as defined by the appended claims, or sacrificing all of its material advantages, the form hereinbefore described being merely a preferred or exemplary embodiment thereof.

What is claimed is:

1. A method for making an austenitic stainless steel drill screw having a head, a threaded shaft, and a drill portion, which comprises:
    forming by cold working on a head and shaft from austenitic stainless steel including nitrogen;
    pressing the end of the shaft opposite the head between a pair of pointer dies to form a drill portion having a pointed part and a cutting edge, each pointer die having a die face, cutting edge and receiving face complementary to the other pointer die;
    forming threads on the shaft, said forming and pressing steps providing increased hardness through cold work hardening;
    passivating the entire surface of the drill screw; and
    aging the drill screw, such that said nitrogen is precipitated to the surface of said drill screw to provide further increased hardness.

2. The method of claim 1, wherein the aging occurs at a temperature and for a time duration that does not cause sensitization of the austenitic stainless steel.

3. The method of claim 2, wherein the screws are aged at a temperature of approximately 500° C.

4. The method of claim 1, wherein the screws are made from 18Cr-12Ni austenitic stainless steel.

5. The method of claim 4, wherein the chemical composition of the austenitic stainless steel, by weight, is 18% Cr, 12% Ni, 1.5% Mn, 0.8% Si, 0.22% N, 0.08% C, and slight quantities of Al and V.

6. The method of claim 1, wherein the threads are formed on the screw shaft by means of a rolling die.

7. A drill screw made according to the method of claim 1, wherein the chemical composition of the austenitic stainless steel, by weight, is 18% Cr, 12% Ni, 1..5% Mn, 0.8% Si, 0.22% N, 0.08% C, and slight quantities of Al and V.

8. A drill screw made according to the method of claim 1.

* * * * *